United States Patent
Franke et al.

(10) Patent No.: US 11,046,895 B2
(45) Date of Patent: Jun. 29, 2021

(54) PREVENTION OF THE EMISSION OF HYDROGEN SULPHIDE IN THE PRODUCTION OF HOT BITUMEN OR ASPHALT

(71) Applicant: YARA INTERNATIONAL ASA, Oslo (NO)

(72) Inventors: Wolfram Franke, Porsgrunn (NO); Hilde Brekke Dahl Thommesen, Stathelle (NO)

(73) Assignee: YARA INTERNATIONAL ASA, Oslo (NO)

( * ) Notice: Subject to any disclaimer, the term of this patent is extended or adjusted under 35 U.S.C. 154(b) by 1 day.

(21) Appl. No.: 16/611,230

(22) PCT Filed: Jul. 17, 2018

(86) PCT No.: PCT/EP2018/069363
§ 371 (c)(1),
(2) Date: Nov. 6, 2019

(87) PCT Pub. No.: WO2019/016193
PCT Pub. Date: Jan. 24, 2019

(65) Prior Publication Data
US 2020/0157438 A1    May 21, 2020

(30) Foreign Application Priority Data
Jul. 17, 2017  (EP) .................................... 17181653

(51) Int. Cl.
*C10G 29/06*   (2006.01)
*C10C 3/04*    (2006.01)
*C10G 27/04*   (2006.01)

(52) U.S. Cl.
CPC ............... *C10G 29/06* (2013.01); *C10C 3/04* (2013.01); *C10G 27/04* (2013.01); *C10G 2300/202* (2013.01); *C10G 2300/207* (2013.01)

(58) Field of Classification Search
CPC .. C10G 29/06; C10G 27/04; C10G 2300/202; C10G 2300/207; C10G 27/12; C10C 3/04; C10C 3/02; C10C 3/023; C10C 3/026; C01F 11/36
See application file for complete search history.

(56) References Cited

U.S. PATENT DOCUMENTS

| 2,045,262 | A | 6/1936 | Comay |
| 9,068,128 | B2* | 6/2015 | Stark ....................... C10G 29/06 |
| 2005/0142096 | A1 | 6/2005 | Wegner |
| 2006/0116450 | A1* | 6/2006 | Buras .................. C08L 2666/08 524/68 |
| 2012/0213662 | A1* | 8/2012 | Matheis ..................... C02F 1/76 422/5 |
| 2017/0306152 | A1* | 10/2017 | Shulga .................... C08L 95/00 |

FOREIGN PATENT DOCUMENTS

| CN | 102153997 A | 8/2011 |
| CN | 103890150 A | 6/2014 |
| EP | 0421683 A1 | 9/1990 |
| WO | 2005065177 A2 | 7/2005 |
| WO | 2005065177 A3 | 7/2005 |

\* cited by examiner

*Primary Examiner* — Prem C Singh
*Assistant Examiner* — Juan C Valencia
(74) *Attorney, Agent, or Firm* — Dilworth IP, LLC

(57) ABSTRACT

The present application relates to a method to prevent the emission of hydrogen sulphide in the production of hot bitumen or asphalt having a temperature of between 150 and 200° C., wherein the method comprises the steps of providing a bituminous or asphalt mixture, heating the mixture until a temperature of between 150-200° C. and adding an aqueous calcium nitrate solution or a calcium nitrate powder while mixing the bituminous or asphalt mixture. The present application furthermore relates to the use of an aqueous calcium nitrate solution or a calcium nitrate powder during mixing of a bituminous or asphalt mixture in the production of a hot bitumen or asphalt having a temperature of between 150 and 200° C. to prevent the emission of hydrogen sulphide.

10 Claims, No Drawings

PREVENTION OF THE EMISSION OF HYDROGEN SULPHIDE IN THE PRODUCTION OF HOT BITUMEN OR ASPHALT

TECHNICAL FIELD

The present application relates to prevention of the emission of hydrogen sulphide ($H_2S$) in the production of hot bitumen or asphalt, more in particular having a temperature of between 150 and 200° C.

BACKGROUND

Hydrogen sulphide ($H_2S$) is a naturally occurring gas that is present in many crude oils. It is furthermore formed by the degradation of sulphur compounds in oil when it is exposed to high temperatures or catalysts in the refining process of oil. The primary blending component for asphalt production, vacuum tower bottoms (VTBs), have particularly high $H_2S$-concentrations because these do not undergo additional processing to remove $H_2S$ through distillation, stripping and sweetening processes. VTBs are among the heaviest of the products coming out of a refinery tower and are typically the product in which sulphur compounds concentrate. Due to the high viscosity of asphalt, it is stored at high temperatures, i.e. between 149 and 204° C., that are high enough to promote further thermal cracking of sulphur-containing compounds and the formation of additional $H_2S$. The amount of cracking and the generation of $H_2S$ is dependent on the structure of the sulphur-compounds present in the oil and on the temperatures involved during processing. $H_2S$ has a tendency to migrate from the liquid phase into the vapor phase above the oil. Certain tank conditions, such as increased liquid volume, agitation and high temperatures, can worsen this already hazardous situation by changing the partition coefficient of the $H_2S$, i.e. the ratio of $H_2S$ in the liquid and vapor phases of the crude oil, in favor of the vapor space. Asphalt has a high number of $H_2S$ partitions into the vapor phase. Typically 1 ppm of $H_2S$ in the liquid phase of asphalt correlates to 400 ppm in the vapor phase. Asphalt can therefore contain extremely high levels of $H_2S$ in the vapor phase, even exceeding 3% (30,000 ppm), which can cause a variety of problems and risks such as safety of personnel that is involved in its storage, handling and transportation such as workers in refineries and road works and also to some extent, people living in the area of such plants and construction sites. Exposure to already very low levels of $H_2S$ can result in significant effect on the health and creates over long time diseases. $H_2S$ is especially malicious because it damps the sense of smell at concentrations as low as 30 ppm, and death can occur within a few breaths at concentrations of 700 ppm.

Today, various chemicals are used to prevent emissions of hydrogen sulphide from hot bituminous or asphalt mixtures such as caustic substances, peroxide, formaldehyde, nitrite and amines.

WO2005065177 discloses a method for reducing hydrogen sulfide emissions from asphalt, comprising adding an inorganic or organic metal salt $H_2S$ scavenger to the asphalt, where the metal of the metal salt $H_2S$ scavenger is selected from the group consisting of zinc, cadmium, mercury, copper, silver, nickel, platinum, iron, magnesium, and mixtures thereof, particularly selected from the group consisting of zinc oxide, cadmium oxide, copper oxide, magnesium oxide and mixtures thereof.

US20060116450 discloses the use of a sulphur emission reducing additive in a crude fraction, such as asphalt, wherein the emissions reducing additive includes a dispersion of a metal oxide, particularly selected from zinc oxide, iron oxide, aluminum oxide and combinations thereof.

EP0421683 discloses a method for reducing $H_2S$ evolution in asphalt comprises introducing an oil soluble metal carboxylic acid salt into the hot asphalt, wherein, in particular, the metal of the carboxylic salt is zinc, iron, cupper or zirconium.

The problems with these compounds are however that they either are hazardous or difficult to handle.

It is consequently a goal of the present application to provide in a solution to prevent formation of hydrogen sulphide in the production of hot bitumen or asphalt.

SUMMARY

According to a first aspect of the present application, a method to prevent the emission of hydrogen sulphide in the production of hot bitumen or asphalt having a temperature of between 150 and 200° C., wherein the method comprises the steps of:

providing a bituminous or asphalt mixture;
heating the mixture to a temperature of between 150-200° C.;
adding an aqueous calcium nitrate solution or a calcium nitrate powder while mixing the bituminous or asphalt mixture.

As the asphalt or bituminous mixture is heated up to a temperature of 150-200° C. to maintain its workability, there is sufficient heat to oxidize the hydrogen sulphide to sulphate by the calcium nitrate which is added during the mixing process. The hydrogen sulphide that is formed is dissolved in the water that is present in the bitumen or asphalt mixture. The substance that is consequently treated with the calcium nitrate is thus $S^{2-}$. The $S^{2-}$ is oxidized in the organic matrix since calcium nitrate is also soluble in the organic matrix. The reaction product that is formed is $CaSO_4$ (gypsum) that is mixed in the hot bitumen or asphalt, through which no waste material is created.

With a calcium nitrate powder is meant calcium nitrate particles having a particle size of less than 0.5 mm.

In an embodiment of a method according to the application, an amount of between 0.5 and 2.0 mg calcium nitrate is added per mg sulphide present in the asphalt or bituminous mixture. More in particular, an amount of around 1 mg calcium nitrate is added per mg sulphide present in the asphalt or bituminous mixture.

In an embodiment of a method according to the application, the calcium nitrate powder has a water content of between 1 and 33 weight %.

In an embodiment of a method according to the application, the aqueous calcium nitrate solution has a concentration of between 45 and 55 weight % of calcium nitrate and between 45 and 55 weight % of water.

According to a second aspect of the present application, the use of an aqueous calcium nitrate solution or a calcium nitrate powder during mixing of a bituminous or asphalt mixture in the production of a hot bitumen or asphalt having a temperature of between 150 and 200° C. to reduce the emission of hydrogen sulphide is described.

In a particular use according to the application, an amount of between 0.5 and 2.0 mg calcium nitrate is used per mg sulphide present in the asphalt or bituminous mixture.

In a more particular use according to the application, an amount of around 1 mg calcium nitrate is used per mg sulphide present in the asphalt or bituminous mixture.

In a possible use according to the application, calcium nitrate powder having a water content of between 1 and 33 weight % is used.

In another possible use according to the application, aqueous calcium nitrate solution having a concentration of between 45 and 55 weight % of calcium nitrate and between 45 and 55 weight % of water is used.

DETAILED DESCRIPTION

A method according to the application to prevent the emission of hydrogen sulphide ($H_2S$) in the production of hot bitumen or asphalt is described herein. More particularly, the method according to the application aims primarily to counteract the emission of $H_2S$ from a hot bitumen or asphalt mixture, rather than to cure the emission. The method comprises the following steps:

Producing or providing a bituminous or asphalt mixture,
heating the bituminous or asphalt mixture to a temperature of between 150 to 200° C., and
adding an aqueous calcium nitrate solution or a calcium nitrate powder while mixing the bituminous or asphalt mixture.

More in particular, an amount of between 0.5 and 2.0 mg calcium nitrate, and most in particular, an amount of around 1 mg calcium nitrate is added per mg sulphide present in the bituminous or asphalt mixture.

In the context of the present invention, the term "bituminous or asphalt mixture" is the residue and heaviest fraction obtained during refining of crude oil. It comprises very long chain hydrocarbon compounds, which do not evaporate during the refining process, and in addition mineral impurities and sulphur compounds. It is understood that the bituminous or asphalt mixture is not made up of a homogenous single hydrocarbon compound.

Suitable assays and ASTM standard methods to determine the sulphide content of petroleum products are known. For asphalt and bitumen, a so-called and well-known "can test" method is typically used, wherein a sample, e.g. an asphalt or bitumen sample, is put into a metal container, and following heating of the container, the $H_2S$ emission of the sample is determined by measuring the $H_2S$ content of the head space in the metal container. The measurement of hydrogen sulfide in the vapor phase may be, for instance, performed according to ASTM D5705-15.

More in particular, the hydrogen sulphide concentration in asphalt or bitumen may be determined via the so-called Baker Hughes field can test method (see e.g. Draper and Stark, 2012, incorporated herein by reference http://www.digitalrefining.com/article/10000336#.WWxveY-SGPRY), which allows for a more reproducible means of establishing the vapour phase in the sample container. In this method, quart-sized metal cans are used which are half-filled with asphalt, which is most appropriately sampled on-site with fresh asphalt directly from the unit into the sampling container. The metal cans are then sealed and shaken using a specially designed container that allows adequate agitation of the sample while protecting the operator from accidental leakage of hot asphalt. Samples are tested immediately using gas detection tubes and after storage at relevant temperatures and time periods.

When calcium nitrate powder is used, the calcium nitrate powder has preferably a water content of between 1 and 33 weight %. The particle size of the calcium nitrate powder is of no importance.

When an aqueous calcium nitrate solution is used, the concentration of calcium nitrate therein is preferably between 45 and 55 weight % and the rest is water, being between 45 and 55 weight %.

The present application furthermore relates to the use of an aqueous calcium nitrate solution of a calcium nitrate powder in the production of the hot bituminous or asphalt mixture during mixing of a bituminous or asphalt mixture, wherein the hot bituminous or asphalt mixture has a temperature of between 150 and 200° C., to prevent the emission of hydrogen sulphide.

In particular, an amount of between 0.5 and 2.0 mg of calcium nitrate, and more in particular, an amount of around 1 mg calcium nitrate per mg of sulphide present in the bituminous or asphalt mixture is used.

When calcium nitrate powder is used, the calcium nitrate powder has a water content of between 1 and 33 weight %. When as an alternative an aqueous calcium nitrate solution is used, the solution has a concentration of between 45 and 55 weight % of calcium nitrate and between 45 and 55 weight % of water.

Example

An experiment was performed using a bituminous emulsion called Elastopaz, an aqueous calcium nitrate solution and an aqueous sulphide solution, and Dräger Tubes®. Elastopaz is a single component bitumen polymer liquid membrane commercialised by the Israelian company Pazkar Ltd. Dräger Tubes® are gas detection tubes commercialized by the US Company Dräger.

Approximately 100 ml of Elastopaz was added to a 600 ml beaker. A watch glass was placed on top of the beaker and the beaker was placed on a heating plate with a magnetic stirrer. The Elastopaz was heated to the boiling point of approximately 100° C. and an aqueous calcium nitrate solution in a concentration of 1 g/l and an aqueous solution of sodium sulphide nonahydrate in a concentration of 1 g/l were added to the hot Elastopaz. To ensure proper mixing, the aqueous calcium nitrate solution and the aqueous solution of sodium sulphide nonahydrate were added in the vortex that was created by the magnetic stirrer. A Dräger-Tube® was placed in the headspace over the beaker under the watch glass using an extension hose to measure the amount of hydrogen sulphide produced. The amount of hydrogen sulphide was measured three times consecutively in each sample. The time between each measurement was between 8 and 10 minutes. The samples were kept a boiling point throughout all measurements.

A total of 12 samples were analysed. Three parallels each of four different calcium nitrate additions, i.e. 0 ml, 2.5 ml, 5 ml and 10 ml, equal to 0, 25, 50 and 100 mg calcium nitrate/litre Elastopaz respectively. 5 ml of the aqueous solution of sodium sulphide nonahydrate, equal to 50 mg $S^{2-}$/litre Elastopaz was added to each sample.

TABLE 1

| Measurement moment | Amount of aqueous CN- solution added (ml) | Amount of $H_2S$ in sample 1 (ppm) | Amount of $H_2S$ in sample 2 (ppm) | Amount of $H_2S$ in sample 3 (ppm) |
| --- | --- | --- | --- | --- |
| 1 | 0 | 15.0 | 7.0 | 3.0 |
| 2 |   | 12.0 | 10.0 | 6.5 |
| 3 |   | 4.0 | 5.0 | 3.0 |

TABLE 1-continued

| Measurement moment | Amount of aqueous CN-solution added (ml) | Amount of H$_2$S in sample 1 (ppm) | Amount of H$_2$S in sample 2 (ppm) | Amount of H$_2$S in sample 3 (ppm) |
| --- | --- | --- | --- | --- |
| 1 | 2.5 | 9.0 | 7.0 | 2.0 |
| 2 |  | 10.5 | 10.0 | 4.0 |
| 3 |  | 3.2 | 2.0 | 2.0 |
| 1 | 5.0 | 3.0 | 1.0 | 1.0 |
| 2 |  | 2.0 | 1.0 | 2.0 |
| 3 |  | 1.0 | 6.0 | 5.0 |
| 1 | 10.0 | 8.0 | 8.0 | 2.0 |
| 2 |  | 10.0 | 3.0 | 0.5 |
| 3 |  | 3.5 | 4.0 | 1.0 |

As the results show in table 1, there is an indication that adding calcium nitrate to hot bitumen or asphalt during the mixing process prevents the emission of hydrogen sulphide. When 2.5 and 5.0 ml of the aqueous calcium nitrate solution is added, the hydrogen sulphide is reduced. Adding 10.0 ml of the aqueous calcium nitrate solution seems to be an overdose.

The invention claimed is:

1. A method to reduce the emission of hydrogen sulphide in the production of hot bitumen or asphalt, wherein the method comprises the steps of:
providing a bituminous or asphalt mixture comprising sulfide;
heating the mixture to a temperature of between 150-200° C.; and
adding an aqueous calcium nitrate solution or a calcium nitrate powder while mixing the bituminous or asphalt mixture.

2. The method according to claim 1, wherein an amount of calcium nitrate added is between 0.5 and 2.0 mg calcium nitrate per mg sulfide present in the bituminous or asphalt mixture.

3. The method according to claim 2, wherein around 1 mg of calcium nitrate is added per mg sulfide present in the bituminous or asphalt mixture.

4. The method according to claim 1, wherein the calcium nitrate powder has a water content of between 1 and 33 weight %.

5. The method according to claim 1, wherein the aqueous calcium nitrate solution has a concentration of between 45 and 55 weight % of calcium nitrate and between 45 and 55 weight % of water.

6. A method comprising adding calcium nitrate to a bituminous or asphalt mixture while mixing at a temperature between 150 and 200° C., the bituminous or asphalt mixture comprising sulfide, wherein the emission of hydrogen sulphide is prevented, the calcium nitrate being in the form of a calcium nitrate solution or powder, wherein the calcium nitrate powder has a particle size of less than 0.5 mm.

7. The method according to claim 6, wherein an amount of between 0.5 and 2.0 mg calcium nitrate is added per mg sulfide present in the bituminous or asphalt mixture.

8. The method according to claim 7, wherein the amount of calcium nitrate added is around 1 mg calcium nitrate per mg sulfide present in the bituminous or asphalt mixture.

9. The method according to claim 6 wherein the calcium nitrate powder has a water content of between 1 and 33 weight %.

10. The method according to claim 6 wherein the aqueous calcium nitrate solution has a concentration of between 45 and 55 weight % of calcium nitrate and between 45 and 55 weight % of water.

\* \* \* \* \*